United States Patent

[11] 3,551,639

[72] Inventor  Paul Gotley
             Essex, England
[21] Appl. No. 647,656
[22] Filed    June 21, 1967
[45] Patented Dec. 29, 1970
[73] Assignee Electrical Remote Control Company
             Limited
             Essex, England
[32] Priority Dec. 30, 1966
[33]          Great Britain
[31]          No. 58,478/66

[54] SOLDERING IRON
     13 Claims, 3 Drawing Figs.
[52] U.S. Cl.................................................... 219/241,
     219/236, 219/501, 219/505; 307/305, 307/310;
     323/22
[51] Int. Cl...................................................... H05b 1/02,
     B23k 3/04
[50] Field of Search........................................... 219/241,
     501, 236, 504, 505; 236/(SCR Digest);
     323/225SCR; 307/305, 310

[56] References Cited
UNITED STATES PATENTS

| 3,422,244 | 1/1969 | Lauck........................ | 219/501 |
| 3,456,095 | 7/1969 | Fox............................ | 219/505X |
| 915,974 | 3/1909 | Leonard..................... | 219/241X |
| 3,337,792 | 8/1967 | Engelson.................... | 219/501(UX) |
| 3,373,262 | 3/1968 | Howell....................... | 219/501X |
| 3,375,347 | 3/1968 | Seney......................... | 219/501X |
| 3,393,856 | 7/1968 | Fortune...................... | 219/241(UX) |

*Primary Examiner*—A. Bartis
*Attorney*—Waters, Roditi, Schwartz & Nissen

ABSTRACT: A soldering iron has a soldering bit carried by a handle and a heating element and a temperature-sensing element for the bit. The handle contains bit temperature control circuitry connected to the heating element and the sensing element. The heating element is in series with a thyristor and the sensing element is in series with resistance to provide a voltage divider the tap of which is connected to the control electrode of the thyristor. Delay circuitry may be connected between the tap and the control electrode to render the soldering iron applicable to a wide range of operating voltages.

PATENTED DEC29 1970  3,551,639

3,551,639

1

SOLDERING IRON

BACKGROUND OF THE INVENTION

This invention relates to soldering irons.

Soldering irons conventionally comprise a handle, a stem and a soldering bit connected, normally releasably, to the stem. An electrical-heating element is provided for heating the bit. When the element is connected to an electrical supply, but soldering is not carried out, the bit temperature rises considerably above the most desirable soldering temperature. Furthermore, when soldering is carried out, the bit temperature fall rapidly below the most desirable soldering temperature.

SUMMARY

The invention provides an electrical-soldering iron comprising: a handle; an soldering bit connected to said handle; electrical supply conductors; a first and a second circuit path connected to said conductors; a heating element for said bit and connected in said first circuit path; and controllable impedance solid state semiconductor device connected in series with said heating element in said first circuit path having an impedance which depends upon the current magnitude in said second circuit path; and a temperature-sensing element physically positioned in the region of said heating element, electrically connected in second path and having an impedance which varies with the heating element temperature to vary said current magnitude so as to cause the heating element temperature to remain within a predetermined temperature range.

This solid state device may be switch means, for example a controllable semiconductor rectifier such as a transistor or silicon controlled rectifier, having two states in one of which the impedance is almost zero and in the other of which it is almost infinite.

DESCRIPTION OF DRAWINGS

In order that the invention may be clearly understood an readily carried into effect, reference will now be made, by way of example, to the accompanying drawings, in which.

DESCRIPTION OF PREFERRED EMBODIMENTS

Figure 1:
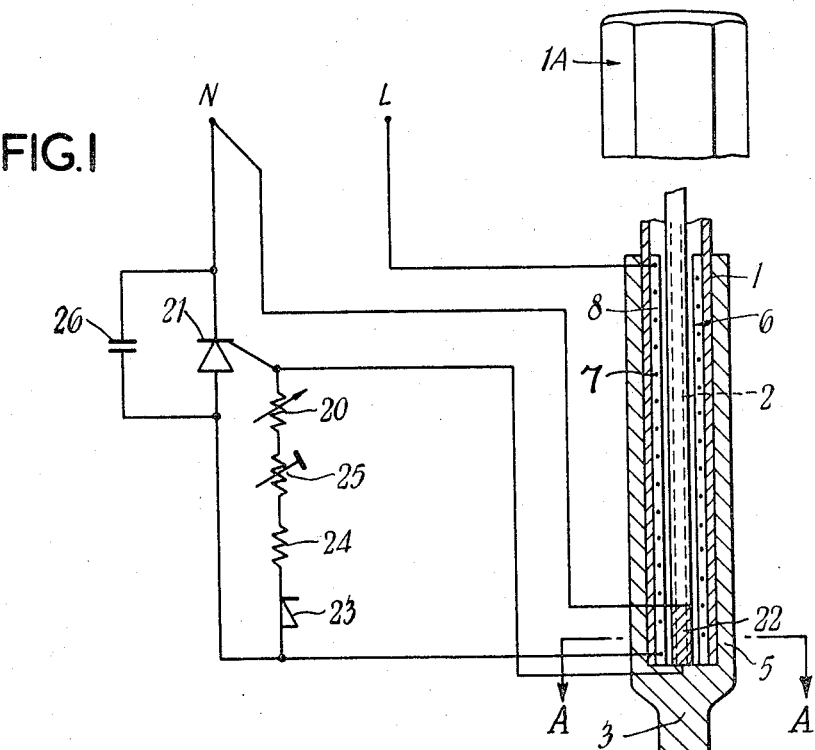
FIG. 1 shows a diagrammatic longitudinal sectional view of the bit end of an electric soldering iron and an electrical circuit thereof.

Referring to FIG. 1, the soldering iron has a handle 1A to which is attached a tubular stem 1. The stem has been formed from rolled sheet material of poor thermal conductivity, for example stainless steel, so that the stem has a longitudinal slot 2 extending the whole length of the stem and from the outer periphery thereof to the inner periphery thereof. Loosely fitted, preferably push-fitted, over the outer end of the stem 1 is a one-piece copper bit 3 consisting of a solid part 4 and a sleevelike part 5 integral with the inner end of the part 4. Inside the free end of the stem is an electrical-heating element 6 the whole, or the major part, of which is surrounded by the bit 3. On engergization of the heating element 6, the stem 1 opens out in the sense of widening of the slot 2 unitl the free end of the stem engages tightly within the sleeve 5. On deenergization of the heating element, the stem 1 closes up in the sense of narrowing of the slot 2 so that the free end of the stem 1 is only loosely situated within the sleeve 5. This arrangement has the advantages that the bit 3 is easily removable but will not fall from the stem when the bit is hot, and that the soldering iron can be more simply and more economically manufactured.

The element 6 is in the form of a tube coaxial with the stem 1 and consists of a helical coil 7 embedded in electrical insulation 8. In manufacture of the element a helical coil of high-resistance wire has deposited thereon by electrophoresis and aluminum compound and then the coil and the compound are fired to produce a hard electrical insulation surrounding the wire. Leads are welded to both ends of the coil, the element 6 is inserted into the stem 1 and an electrical temperature-sensing element 22 (a thermistor) is inserted into the element 6. The element 22 may alternatively consist of a ceramic core on which is wound a helical coil of fine-gauge wire having its ends welded to leads. Although for ease of illustration the leads are shown as extending laterally from the elements 6 and 22, it will be appreciated that the leads in fact extend in an electrically insulated manner within the stem 1 to the handle of the soldering iron. The insulation 8 insulates the coil 7 from both the stem 1 and the thermistor 22. The described method of manufacture of the element 6 is both easy and economical. If desired, the coil 7 can instead have its axis of serpentine form. The heating coil 7 is connected across the terminals L and N by a solid state semiconductor device, here a silicon controlled rectifier 21 acting as a switch. A series arrangement of a diode 23, a fixed resistance 24, a trimmer resistance 25 and a variable resistance 20 are connected between the anode and gate electrodes of the rectifier 21.

For an operating voltage of 24 v., typical values are 50 k $\Omega$ for the resistances 20 and 25, 25 k $\Omega$ for the resistance 24 and 100 k$\Omega$ cold resistance for the thermistor. The thermistor is connected between the gate electrode and the terminal N.

When the iron is cold the thermistor will have a cold resistance of the order of 100,000 ohms. When alternating voltage is applied to terminals L and N current will commence to flow during alternate half cycles through terminal L, coil 7, diode 23, resistance chain 24, 25 and 20 and thermistor 22 to terminal N. The thermistor, at this stage, has a very high resistance compared with that of the resistances 24, 25 and 20 in series. As soon as the voltage between terminals L and n reaches approximately 2 v. in the first half cycle, the gate electrode will have sufficient voltage to fire the silicon controlled rectifier 21. Immediately rectifier 21 is fired, the voltage drop across the rectifier is reduced to approximately ½v., i.e. its forward voltage drop. The fired rectifier 21 will of course for all practical purposes short circuit the resistance chain. This reduces immediately the power consumption in the control circuit.

Consequently the soldering iron is heated, but there is virtually no power dissipation in the handle of the soldering iron where the diode 23, resistance 20, 24 and 25, the rectifier 21 and a condenser 26 are located. The heating element 7 and the thermistor 22 are located inside the soldering iron stem.

When the applied alternating voltage is passing through the second half of its cycle, the polarity of terminal N with respect to terminal 1 is reversed and virtually no current at all will flow. Accordingly, the current wave form applied to the element under these conditions is approximately a half wave rectified sinusoldal wave form.

It is possible to provide full wave heating of the element by increasing the number of control elements but at the same time heat dissipation in the handle of the soldering iron would be increased.

As the soldering element heats up by virtue of energization in alternate half-cycles, the resistance of the thermistor rapidly falls. At a typical controlled temperature of say 250° C., the resistance of the thermistor might be only of the order of 30 ohms. When this condition is reached, the gate-to-cathode voltage of the rectifier 21 never increases sufficiently to fire the rectifier. Under these conditions, only a minute current is flowing through the soldering iron element 7, the same current passing also through the resistance chain and thus causing a small dissipation of heat in the handle of the soldering iron.

Using a typical soldering iron with an element developing a power of approximately 40 watts, the heating up and cooling down rate of the soldering iron is such that the rectifier 21 goes from its fully on state to its substantially nonconducting state in a matter of seconds.

The power developed in the heating element, and therefore the temperature of the soldering iron, is controlled by the firing angle of the rectifier which angle is influenced both by the temperature of the thermistor and by the resistance chain including the resistance 20.

The adjustable resistance 20 therefore provides a controlled setting of the mean soldering iron temperature and will be provided with a visible temperature scale calibrated correctly at the factory by resistance 25.

The ranges of component values indicated apply to soldering iron, operating from a low voltage source of, say, 24 v. 50 c/s. For direct operation from a mains supply, component values will have to be altered accordingly, of course.

Figure 2:
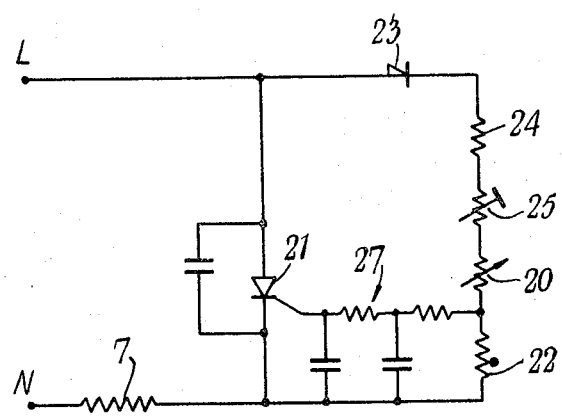
FIG. 2 shows a modified version of the electrical circuit of FIG. 1.
Figure 3:
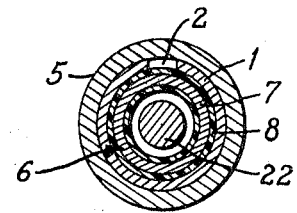
FIG. 3 is a sectional view taken along line A–A in FIG. 1.

FIG. 2 2 illustrates a modification in which the circuit is adapted for use over a wide range of voltages without adjustment. In this embodiment, this adaptability is achieved by having the rectifier nonconductive through the peak regions of applied voltage. For this purpose the rectifier is fired in the latter half of alternate half-cycles so as only to pass current during the fall towards zero of the applied voltage. This is achieved by employing a phase-shift circuit 27, consisting in this case of a resistance-capacitance network, connected between the gate electrode and the junction of resistance 20 and thermistor 22. Accordingly the phase delay will be greater than $\pi/2$ at the rated frequency, i.e. greater than a two hundredth of a second, but less than one hundredth of a second at 50 c/s.

I claim:

1. An electrical-soldering iron comprising: a handle; a soldering bit connected to said handle; electrical supply conductors; a first circuit connected to said conductor; a heating element for said bit and connected in said first circuit; controllable semiconductor rectifier means having an anode, a cathode and a gate with the anode to cathode path of said rectifier means connected in series with said heating element in said first circuit; a second, gating, circuit connected across said rectifier means for firing angle control of said rectifier means; a rectifier connected to produce unidirectional current flow in said second circuit; a voltage divider in said second circuit and providing a tap; a constant impedance direct-current path connecting said tap and said gate; and a temperature-sensing element physically positioned in the region of said heating element, electrically connected as part of said voltage divider and having an impedance which varies with heating element temperature to cause said temperature to vary within a predetermined temperature range by firing angle control of said rectifier means.

2. A soldering iron according to claim 1 wherein said second circuit is connected between said anode and said cathode of said rectifier means and the parallel arrangement of said second circuit and said rectifier means is connected to said conductors via said heating element.

3. A soldering iron according to claim 2 wherein said voltage divider consists of said sensing element and a resistance.

4. A soldering iron according to claim 3 wherein said resistance is variable for presetting said temperature range.

5. A soldering iron according to claim 3 wherein one end of said sensing element is connected to said cathode and the other to said gate via said direct-current path.

6. A soldering iron according to claim 1 wherein said direct-current path is provided by a direct connection.

7. A soldering iron according to claim 1 wherein said direct-current path is provided by a resistance.

8. A soldering iron according to claim 1, and including delay means for delaying the striking of said rectifier means so that said striking will occur in the latter half of a half cycle of alternating voltage, at a predetermined operating frequency, applied to said supply conductors.

9. A soldering iron according to claim 8 wherein said delay means has a delay of more than a quarter of a cycle at an operating frequency of 50 c/s.

10. A soldering iron according to claim 5 comprising delay means connected between said tap and said gate for delaying the striking of said rectifier means so that said striking will occur in the latter half of a half cycle of alternating voltage, at a predetermined operating frequency, applied to said supply conductor.

11. A soldering iron according to claim 8 wherein said delay mean is a resistance-capacitance network.

12. A soldering iron according to claim 1 wherein all the components of said first and second circuits, apart from said heating element and said sensing element, are mounted within said handle.

13. A soldering iron according to claim 1, wherein said rectifier is in series in said second circuit.